Figure 1:
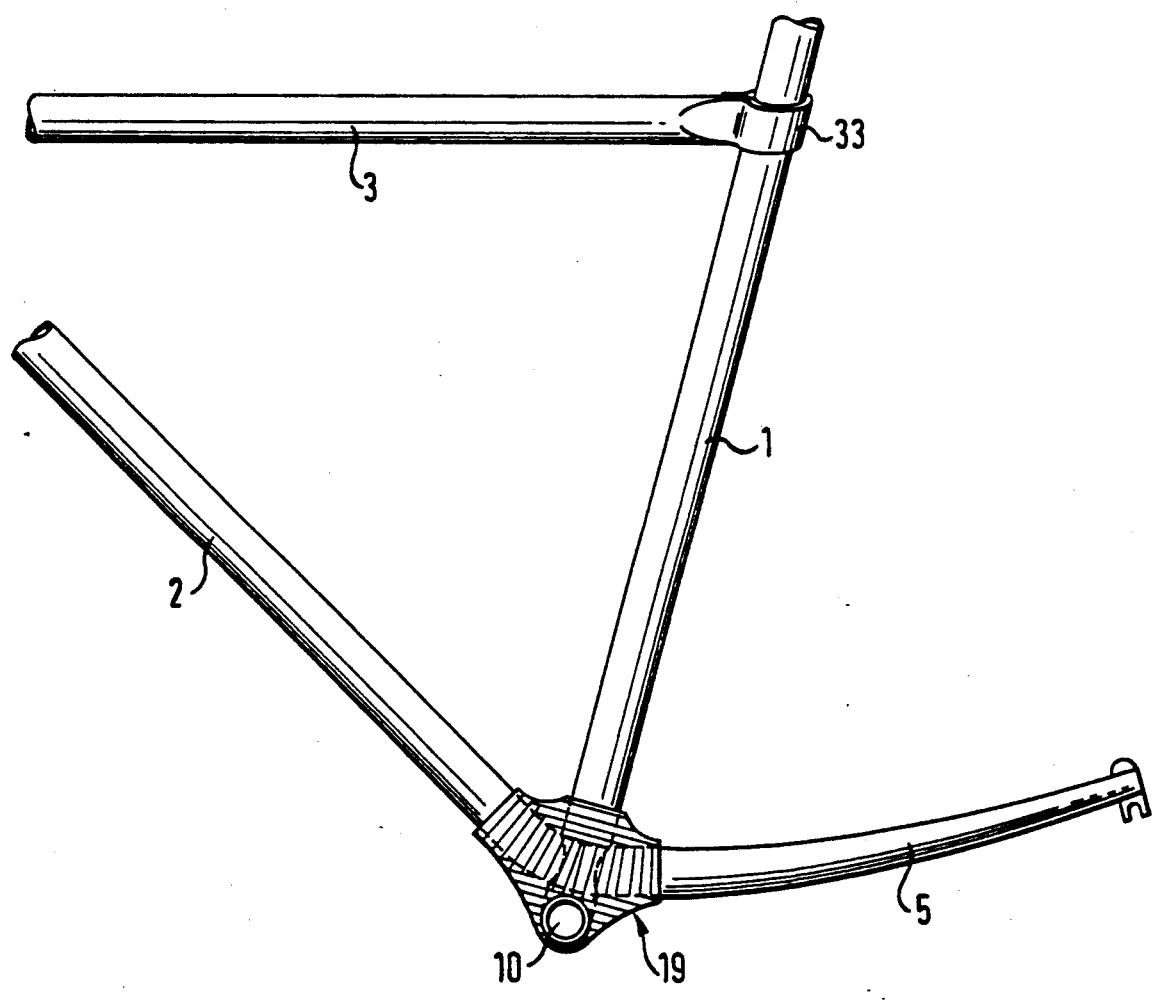

United States Patent [19]

van Raemdonck

[11] Patent Number: 5,188,384

[45] Date of Patent: Feb. 23, 1993

[54] BICYCLE FRAME
[75] Inventor: Joris van Raemdonck, Bazel, Belgium
[73] Assignee: Look S.A., Nevers cedex, France
[21] Appl. No.: 614,175
[22] Filed: Nov. 15, 1990
[30] Foreign Application Priority Data
Nov. 20, 1989 [DE] Fed. Rep. of Germany ....... 3938509
[51] Int. Cl.⁵ ...................... B62K 19/16; B62K 19/18
[52] U.S. Cl. ................................. 280/281.1; 264/258
[58] Field of Search ................ 280/281.1, 288, 288.3; 264/256, 258; 403/205, 206, 209, 233, 235, 241, 382

[56] References Cited

U.S. PATENT DOCUMENTS

| | | | |
|---|---|---|---|
| 964,297 | 7/1910 | Moore | 403/233 |
| 2,670,219 | 2/1954 | Shakesby et al. | 280/281.1 |
| 4,493,749 | 1/1985 | Brezina | 280/281.1 |
| 4,541,649 | 9/1985 | Grunfeld | 280/281.1 |
| 4,900,048 | 2/1990 | Derujinsky | 280/281.1 |
| 4,902,458 | 2/1990 | Trimble | 280/288.3 |

FOREIGN PATENT DOCUMENTS

| | | | |
|---|---|---|---|
| 91920 | 5/1897 | Fed. Rep. of Germany | 280/281.1 |
| 95460 | 12/1897 | Fed. Rep. of Germany | 280/281.1 |
| 934359 | 5/1948 | France | 280/281.1 |
| 942350 | 9/1948 | France | 280/281.1 |
| 1062107 | 3/1967 | United Kingdom | 280/281.1 |

*Primary Examiner*—Mitchell J. Hill
*Attorney, Agent, or Firm*—Townsend and Townsend

[57] ABSTRACT

A bicycle frame having separate tubes made of composite material and joined to each other in the region of the crank axle bracket with a coiled band also made of composite material. This solid coiled band arrangement, which joins together the saddle frame tube, the lower frame tube and the rear fork tubes with the crank axle bracket, provides a compact junction and force transmitting unit.

7 Claims, 6 Drawing Sheets

BICYCLE FRAME

BACKGROUND OF THE INVENTION

The invention relates to a bicycle frame comprising a saddle frame tube, an upper frame tube and a lower frame tube, a steering head tube joined to the upper and lower frame tubes as well as rear fork tubes projecting from the junction zone between the saddle frame tube and the lower frame tube and a crank axle bracket disposed in this junction zone.

A bicycle frame of this type as well as a method for its manufacture is described in the European patent application 89 109 392.4 and is characterized by a low weight, a large freedom in the shaping and advantageous finishing possibilities.

SUMMARY OF THE INVENTION

The object of the present invention is to improve a bicycle frame of this type, notably with respect to the mechanical stability which can be attained and additionally to simplify the manufacture while keeping all other advantages.

This object is met according to the invention essentially by the fact that at least the saddle frame tube, the lower and upper frame tubes and the rear fork tubes are made of fiber and/or fabric reinforced plastics, such as carbon fiber materials. The lower frame tube is formed by at least two sheathed separate tubes, these separate tubes being bent away from each other in the manner of a fork before the saddle tube and forming thereafter the rear fork tubes beyond the junction zone between the saddle frame tube and the lower frame tube. The junctions between the tubes are made of fiber and/or fabric reinforced plastics being ensured by coiled bands of fiber and/or fabric reinforced plastics which can be hardened together into a form with the tubes under the action of heat and pressure. The crank axle bracket being is joined to the saddle frame tube by means of a coiled band arrangement and disposed directly adjacent to or in the area forking of the rear fork tubes. The crank axle bracket is surrounded by the together joined coiled bands of the saddle frame tube, of the lower frame tube and of the rear fork tubes and integrated in the thus formed coiled band arrangement.

The particular advantage in this case is to achieve a very solid junction permitting high mechanical strength between the saddle frame tube, the lower frame tube, the rear fork tubes and the crank axle bracket.

By means of the arrangement of the coiled bands utilized as regards the dimensioning or the strength of the yarns and the selectable directions of their course, the forces transmitted to the bands by the various tubes and also by the crank axle bracket can be optimally absorbed and distributed so as to avoid particularly heavily loaded areas or areas which are loaded in an undesired manner.

A particularly high safety against the widening forces in the area of the passage for the saddle frame tube is achieved in a simple manner by the use of a special bracing band integrated in the coiled band in the forking area of the rear fork tubes.

An advantageous junction between the upper frame tube and the saddle frame tube is achieved in that the upper frame tube is made to have an extension, is flattened on the side of the saddle tube, is wound about the saddle frame tube and bent back to the frame tube at its free end and is applied against and fixed to the frame tube by means of a coiled band which is notably wound about the saddle frame tube as well as the upper frame tube. This junction of the upper frame tube and the saddle frame tube is distinguished by a particular solidity and stability.

The junction between the lower end of the saddle frame tube and the crank axle bracket can also be effected in a manner similar to the above described junction, and this junction technique on the side of the crank axle bracket will be advantageously combined with a multiple tube construction of the lower frame tube. This lower frame tube comprises in this case preferably four separate tubes wound with a coiled band, the separate tubes being bent away from each other in pairs in the manner of a fork before the saddle frame tube in such a way that a pair of tubes extends below and a pair of tubes extends above the crank axle bracket and adjacent separate tubes on either side of the saddle frame tube form together the respective rear fork tubes with a coiled band.

By means of this construction is achieved a surprisingly high mechanical strength, since an optimal force transmission in the coiled band and additionally a high strength of the tubes integrated in these coiled bands is attained in cooperation with the coiled band arrangement wound about the entire zone of the crank axle bracket.

Figure 2:
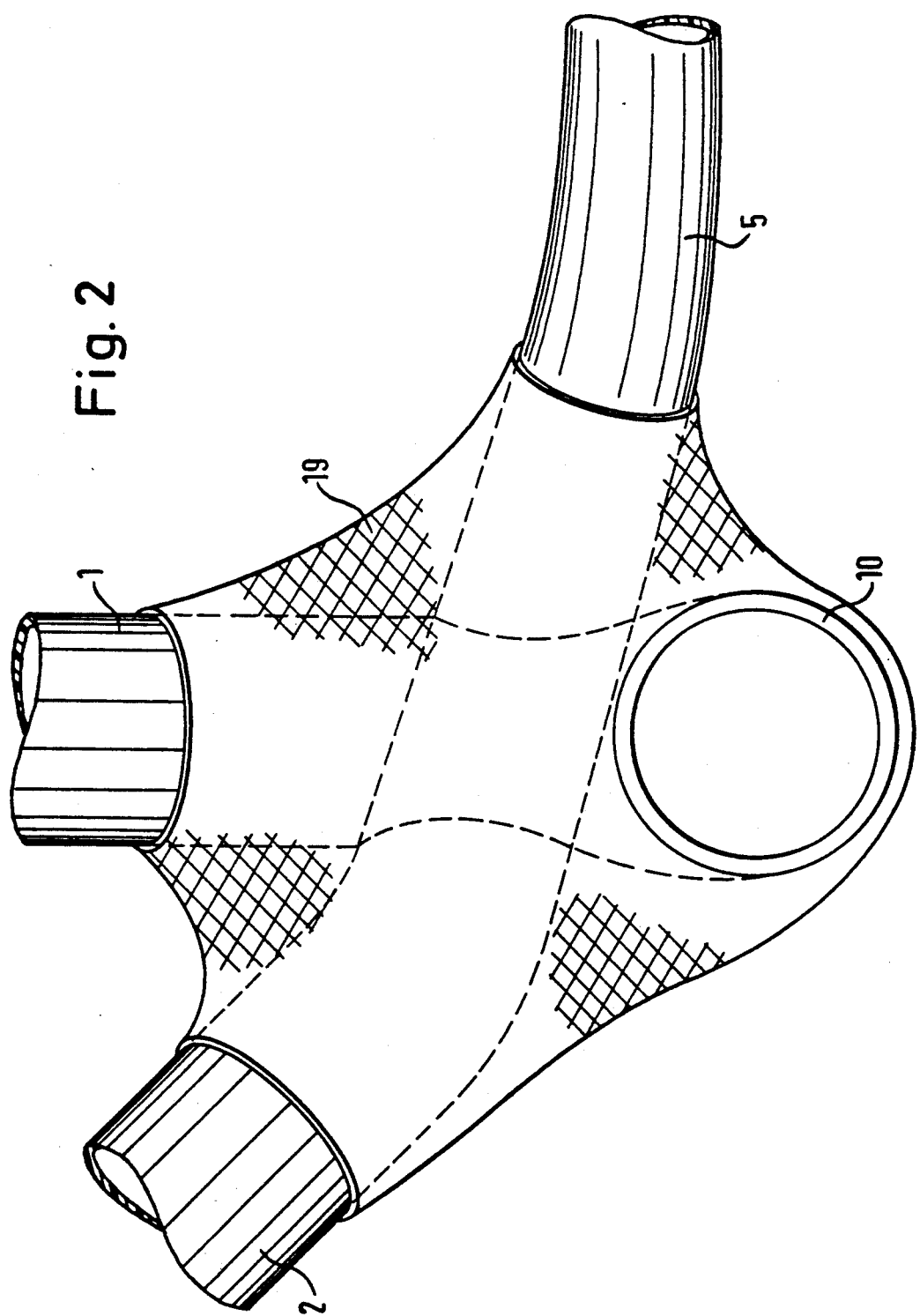
Figure 3:
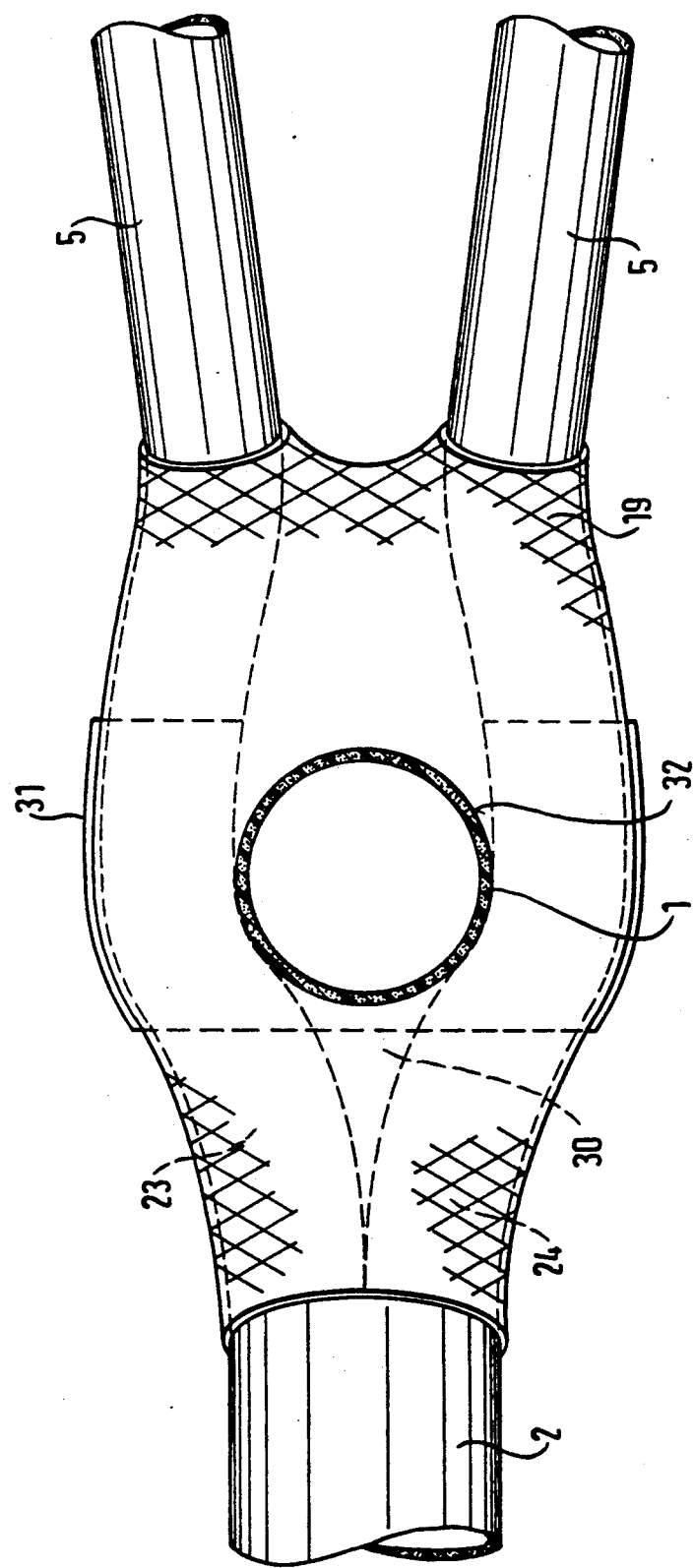
Figure 4:
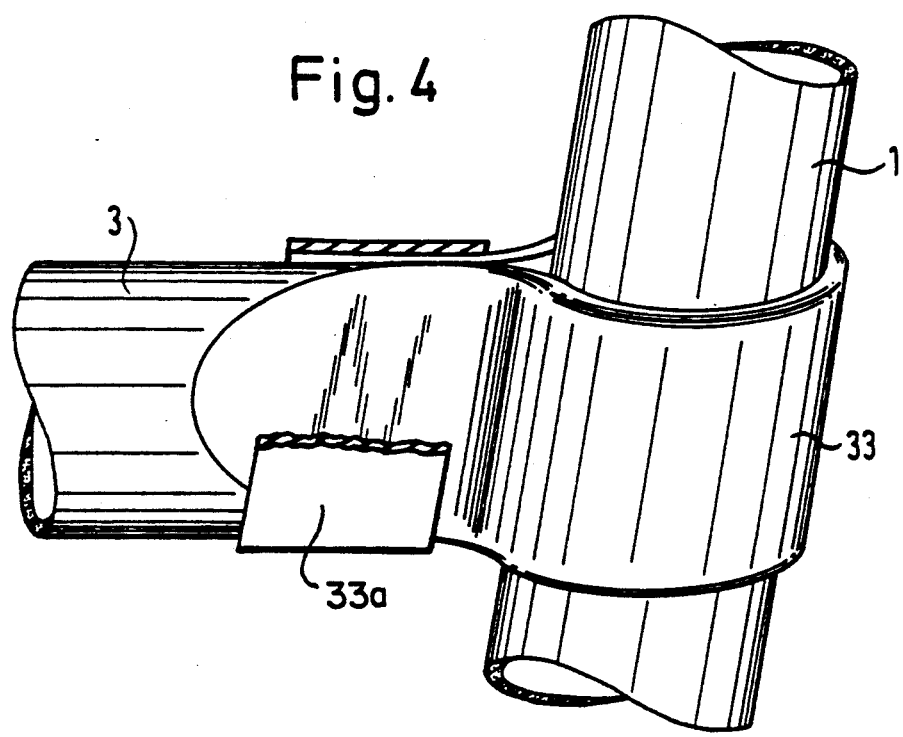
Figure 5:
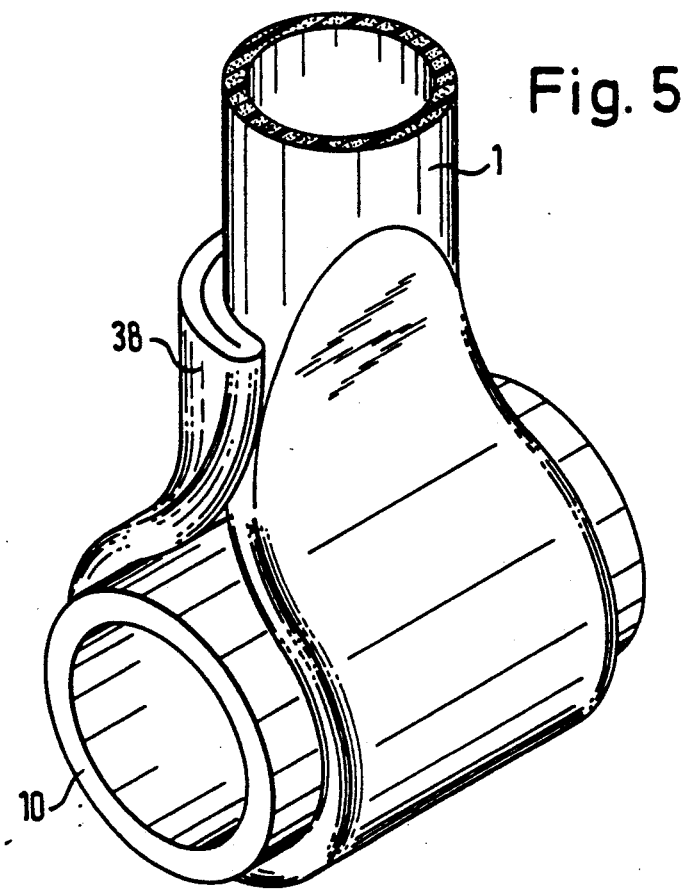
Figure 6:
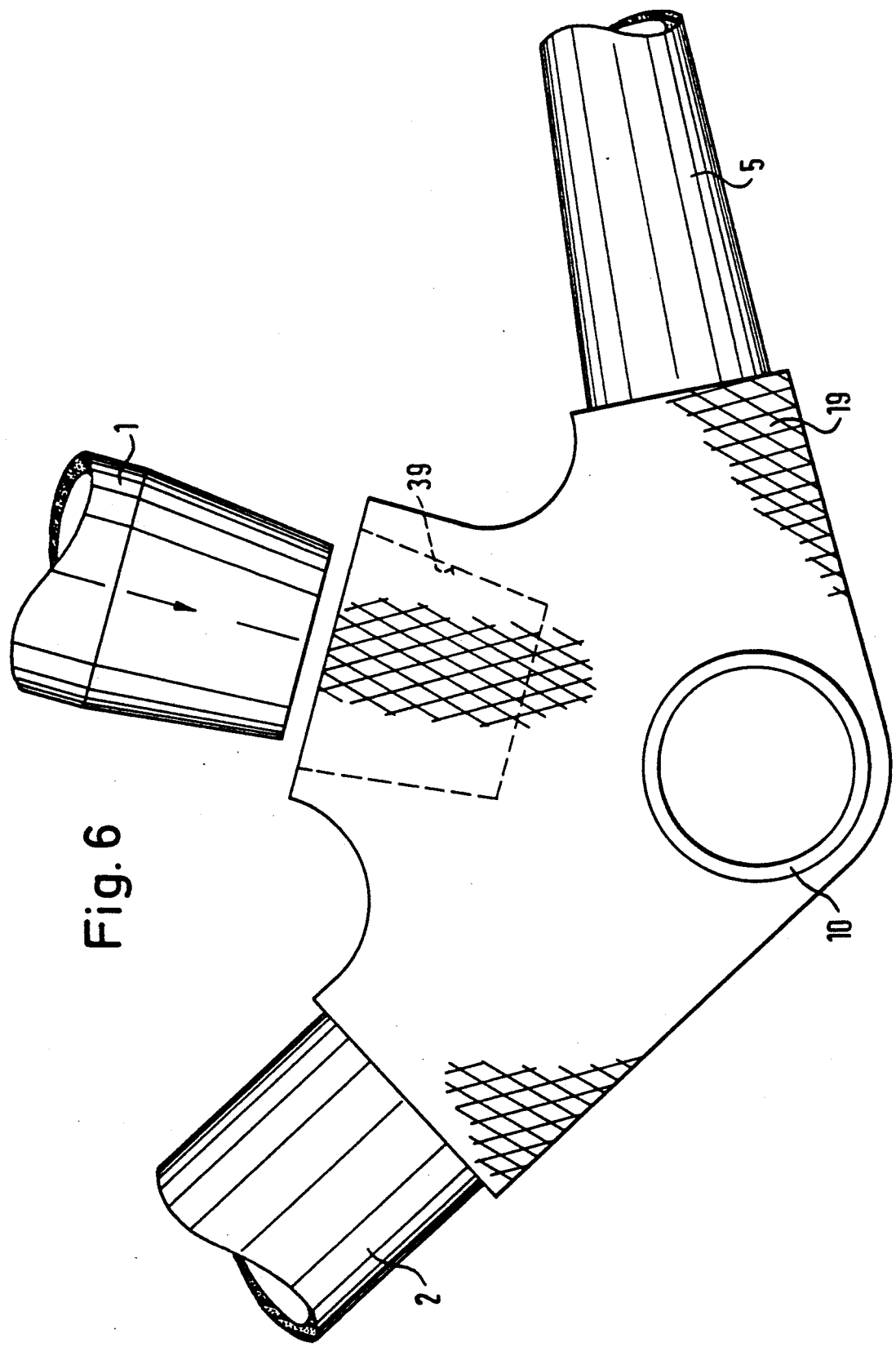
Figure 7:
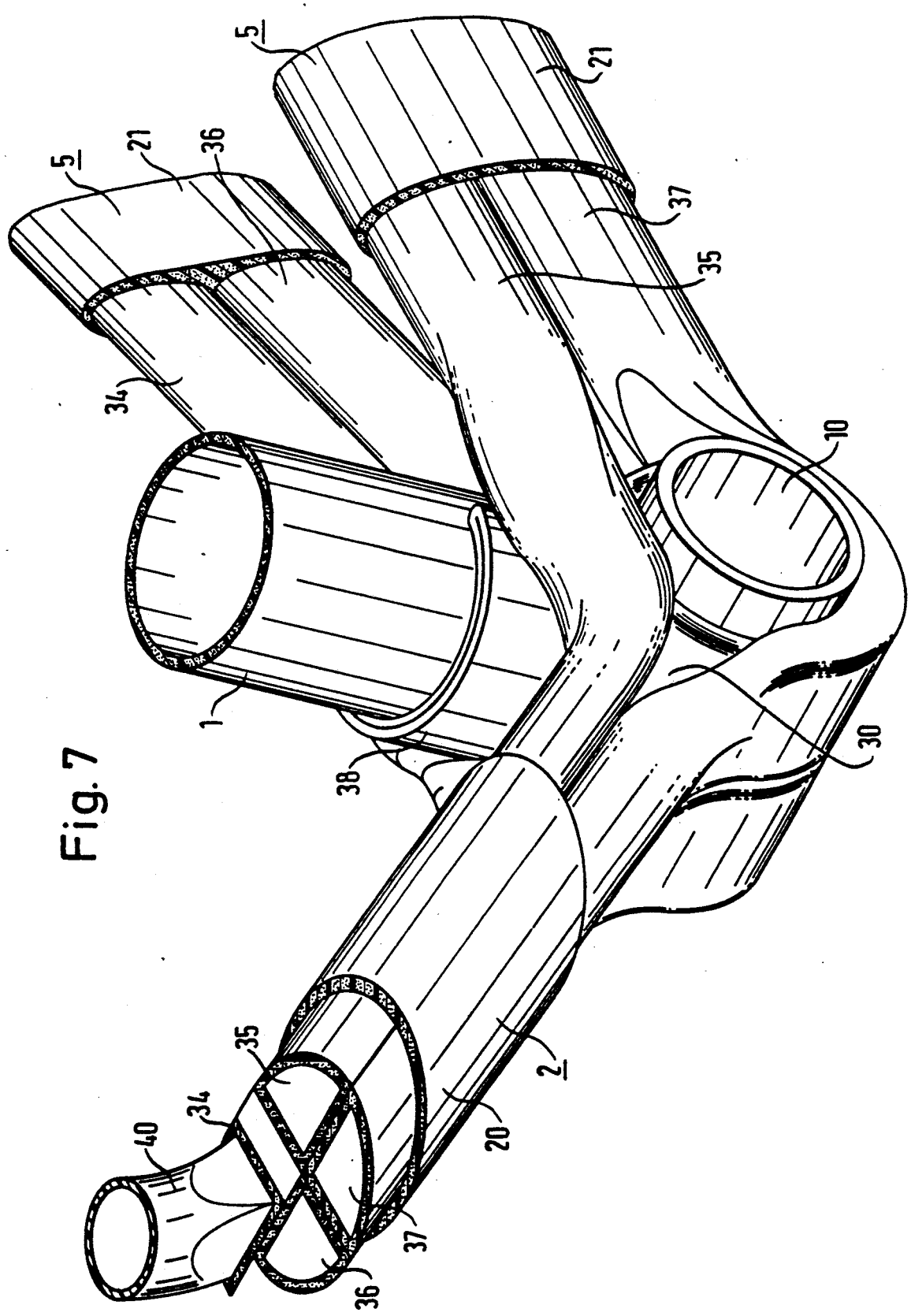

Further advantageous developments and features of the invention will appear upon reading the following description with reference to the accompanying drawings, in which:

FIG. 1 is a schematic illustration for the explanation of the basic construction of the bicycle frame according to the invention, FIG. 2 is an enlarged illustration of the zone of the crank axle bracket of the bicycle frame of FIG. 1 in side view, FIG. 3 is a schematic illustration of the zone of the crank axle bracket of FIG. 2 in plan view, FIG. 4 is a schematic illustration for expliciting the junction of the saddle frame tube and the upper frame tube, FIG. 5 is a schematic illustration of a preferred junction of the saddle frame tube and the crank axle bracket, FIG. 6 is a schematic illustration of an alternative embodiment of a junction between the coiled band and the saddle frame tube on the side of the crank axle bracket, and FIG. 7 is a schematic illustration of a preferred construction of the frame tubes and the junction of these frame tubes with the crank axle bracket.

The partial illustration of a bicycle frame shown in FIG. 1 comprises a saddle frame tube 1, a lower frame tube 2, an upper frame tube 3 as well as rear fork tubes 5 and a crank axle bracket 10 notably made of metal.

The junction between the upper frame tube 3 and the lower frame tube 2 and their junction with a steering head tube is not shown in FIG. 1, but corresponds advantageously to the construction explained in junction with European patent application 89 109 392.4.

All the tubes are made in the manner described in the afore mentioned European patent application from a composite material in the form of a fiber and/or fabric reinforced plastics, notably with the use of carbon fibers, the shaping and the hardening of these tubes as well as the associated junction or coil bands into a form being effected by using pressure and temperature.

The upper frame tube 3 and the saddle frame tube 1 are joined to each other by means of a loop band 33 to be described in detail later.

The lower frame tube 2 comprises two separate tubes, which are forked in the zone of the crank axle bracket and form then the rear fork tubes 5.

In the zone of the crank axle bracket 10 is produced a coiled band arrangement by means of a coiled band 19 as shown in detail in FIGS. 2 and 3.

The relative position of the saddle frame tube 1, the lower frame tube 2 and the rear fork tubes 5 and the crank axle bracket 10 connected thereto can be seen in the side view of FIG. 2. The crank axle bracket 10 is joined to the saddle frame tube 1 by means of a coiled band formed in the shape of a sheath on the side of the saddle frame tube and is disposed directly below and adjacent to the forked separate tubes 23, 24 as can be seen in FIG. 3.

The separate tubes 23, 24 can be protected against widening by means of a special bracing band 31 and appropriate measures will be taken in order to achieve a passage 32 for the saddle frame tube 1 in the forking zone 30 shown in FIG. 3, this passage permitting the assembly of these components without problem, and the, latter being joined thereafter together by means of the coiled band 19 into a solid band arrangement in which the crank axle bracket 10 is also integrated.

Thanks to this coiled band arrangement is attained an extremely compact and mechanically solid junction zone wherein the faced arrangement permits to transfer and to take up advantageously all the forces which practically occur in this zone.

FIG. 4 shows the junction between the upper frame tube 3 and the saddle frame tube 1 by means of a loop band 33. This loop band 33 makes it possible to join the upper frame tube 3 and the saddle frame tube 1 in abutment against each other and to avoid thereby the provision of a through bore leading to increased manufacture requirements. The free ends of the loop band 33 can be fixed to the upper frame tube 3 by means of a coiled band 33a, which is also in this case led about the saddle frame tube 1 and can be formed in the same manner as the other coiled bands and is hardened into a form under the action of pressure and heat.

FIG. 5 shows an advantageous junction technique between the saddle frame tube 1 and the crank axle bracket 10. In this case the saddle frame tube 1 is made longer as actually necessary, and the end portion corresponding to this additional length of the saddle frame tube is flattened and wound about the crank axle bracket 10 and bent back against the saddle frame tube 1. The flattened end portion 38 adapts itself to the crank axle bracket 10 as well as to the saddle frame tube 1 in a form-locked manner. The final fixation is achieved by means of a coiled band, and the mutual junction of the separate components is effected in the manner already explained into a form with the action of pressure and temperature. FIG. 6 shows an alternative embodiment of the invention in which the lower frame tube 2, the crank axle bracket 10 and the rear fork tubes are assembled by means of a coiled band into a coiled band assembly. The saddle frame tube 1 is in this case not integrated in this coiled band assembly but there is provided a slightly conical recess 39 in this coiled band assembly, for receiving in a form-locking manner the end of the saddle frame tube 1 which is subsequently inserted. The saddle frame tube 1 can be bonded in this recess 39 but advantageously the junction is effected by fusing in a heated form, a pressure hose extending into the end of the saddle frame tube 1 so as to ensure that the wall of the saddle frame tube is firmly pressed against the wall of the recess 39 and therefore a satisfactory junction is achieved. This alternative embodiment can provide advantages with respect to manufacturing techniques depending upon the considered manufacturing possibilities.

A particularly advantageous construction of the invention is shown in FIG. 7.

In this case the saddle frame tube 1 is joined to the crank axle bracket in the manner already explained in junction with FIG. 5 and this type of junction is combined with a four tube construction of the lower frame tube 2. It is mainly observed that the technique of junction with the crank axle bracket made possible by the four tube construction of the lower frame tube 2 is advantageous independently from the special junction between the saddle tube 1 and the crank axle bracket.

The lower frame tube 2 comprises separate tubes 34, 35, 36, 37, which are surrounded by a coiled band 20. In lieu of a coiled band can however be also used a tube or sheath which surrounds these separate tubes 34, 35, 36, 37 or serves as a receiver for these tubes. Preferably a pressure hose 40 is disposed in each of the tubes and maintained under pressure during the hardening step into a form, until the final finishing.

Before the saddle tube 1 these separate tubes 34, 35, 36, 37 are bent away from each other in pairs into the shape of a fork in such a way that a first pair of tubes 36, 37 extends below and a second pair of tubes 34, 35 extends above the crank axle bracket 10 and enclose therefore this crank axle bracket 10 between them. Starting from the crank axle bracket 10 each of the tubes adjacent to each other 34, 36 or 35, 37 form the upper or lower fork member of the respective rear fork tube 5 which are surrounded by an outer tube or a coiled band.

Since the separate tubes 34, 36 or 35, 37 are disposed above one another in the rear fork region, a particularly advantageous construction is achieved as regards the forces to be taken up.

In the forking zone 30 the separate tubes can be flattened or deformed in such a way as to produce an optimal structure both in consideration of space as well as with respect to the taking up of the generated forces, this structure being wound in the already explained manner and can be hardened into a form under the action of pressure and temperature.

I claim:

1. A bicycle frame comprising a saddle frame tube, an upper frame tube and a lower frame tube, a steering head tube joined to the upper and lower frame tubes as well as rear fork tubes projecting from a junction zone between the saddle frame tube and the lower frame tube and a crank axle bracket disposed in the junction zone, at least the saddle tube, the lower and upper frame tubes and the rear fork tubes being made of fiber or fabric reinforced plastics, notably by the use of carbon fiber material, the lower frame tube being formed by at least two sheathed separate tubes, the separate tubes being bent away from each other in the manner of a fork before surrounding the saddle tube and forming the rear fork tubes beyond the junction zone between the saddle tube and the lower frame tube, the junctions between the tubes being made of fiber and/or fabric reinforced plastics and being produced by means of coiled bands of fiber and/or fabric reinforced plastics, which can be hardened into a form, together with the tubes under the action of heat and pressure, and the crank axle bracket being disposed beneath the two separate tubes and being joined to the saddle tube by means of a coiled band arrangement and disposed directly adjacent to or in the forking area of the rear fork tubes, and the crank axle bracket being surrounded by the joined coiled bands of the saddle tube, of the lower frame tube and of the rear fork tubes and integrated in the thus formed coiled band arrangement.

2. A bicycle frame according to claim 1, wherein the saddle frame tube includes a lower end having a flattened end proximate the crank axle bracket which is wound about the crank axle bracket and bent back against the saddle frame tube, and a coiled band applied about said saddle frame tube and the lower end thereof to thereby attach and fix the saddle frame tube to the crank axle bracket.

3. A bicycle frame comprising:
 a saddle frame tube made of composite material including reinforced plastic;
 an upper frame tube made of composite material including reinforced plastic, said upper frame tube converging with and abutting against said saddle frame tube, a loop band joining together said upper frame tube and said saddle frame tube and first coiled band made of reinforced plastic securing the loop band;
 a lower frame tube made of composite material including reinforced plastic and comprising first and second separate, spaced apart tubes disposed about the saddle frame tube and defining rearwardly extending forked tubes, a second coiled band made of reinforced plastic wrapped about said saddle frame tube and said lower frame tube connecting the rear forked tubes to and integrating them with said saddle frame tube; and
 a crank axle bracket disposed beneath the rearwardly extending forked tubes, said second coiled band integrating said crank axle bracket with and joining it to said saddle frame tube, said lower frame tube and said rear fork tubes.

4. A bicycle frame comprising:
 a saddle frame tube made of composite material including reinforced plastic and having a conical lower end;
 an upper frame tube made of composite material including reinforced plastic;
 a lower frame tube made of composite material including reinforced plastic and comprising first and second separate, spaced apart tubes disposed about the saddle frame tube and defining rearwardly extending forked tubes, a coiled band made of reinforced plastic wrapped about said saddle frame tube and said lower frame tube connecting the rear forked tubes to and integrating them with said saddle frame tube;
 a crank axle bracket disposed beneath the rearwardly extending forked tubes, said second coiled band integrating said bracket with and joining it to said saddle frame tube, said lower frame tube and said rear fork tubes, said coiled band defining a conical recess at the side of said crank axle bracket for securing the conical lower end of said saddle frame tube in a form-locked manner to the coiled band.

5. A bicycle frame comprising:
 a saddle frame tube made of composite material including reinforced plastic;
 an upper frame tube made of composite material including reinforced plastic;
 a crank axle bracket;
 a lower frame tube made of composite material including reinforced plastic and comprising four separate tubes disposed about and extending rearwardly from the saddle frame tube in pairs each defining rear forked tubes, one tube of each pair of tubes being disposed above the crank axle bracket and one pair being disposed beneath said crank axle bracket, a coiled band made of reinforced plastic surrounding each pair of tubes on respective sides of the saddle frame tube and securing them to each other.

6. A bicycle frame according to claim 5, wherein at least portions of the tubes of each pair of tubes disposed beneath the crank axle bracket are flattened and shaped to follow an outline of the crank axle bracket.

7. A bicycle frame according to claim 6, including sheathing tubes surrounding the four separate tubes in the vicinity of the lower frame and surrounding portions of the pairs of tubes forming the rear forked tubes.

* * * * *